US010204061B2

(12) United States Patent
Lian (10) Patent No.: US 10,204,061 B2
(45) Date of Patent: Feb. 12, 2019

(54) DUAL-SYSTEM-BASED DATA STORAGE METHOD AND TERMINAL

(71) Applicant: Yulong Computer Telecommunication Scientific (Shenzhen) Co., Ltd., Guangdong (CN)

(72) Inventor: Shuang Lian, Guangdong (CN)

(73) Assignee: YULONG COMPUTER TELECOMMUNICATION SCIENTIFIC (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 15/495,015

(22) Filed: Jun. 26, 2017

(65) Prior Publication Data

US 2017/0286321 A1 Oct. 5, 2017

Related U.S. Application Data

(63) Continuation of application No. PCT/CN2015/085886, filed on Jul. 31, 2015.

(30) Foreign Application Priority Data

Oct. 24, 2014 (CN) .......................... 2014 1 0578085

(51) Int. Cl.
*G06F 12/14* (2006.01)
*G06F 21/62* (2013.01)

(52) U.S. Cl.
CPC ...... *G06F 12/1416* (2013.01); *G06F 12/1408* (2013.01); *G06F 12/1458* (2013.01); *G06F 21/62* (2013.01); *G06F 2212/1052* (2013.01); *G06F 2212/402* (2013.01)

(58) Field of Classification Search
CPC ............. G06F 12/1408; G06F 12/1416; G06F 12/1458; G06F 21/31; G06F 21/41; G06F 21/51; G06F 21/53; G06F 21/57
USPC ..... 711/164, 165; 726/16, 21, 27, 28, 29, 30
See application file for complete search history.

(56) References Cited

U.S. PATENT DOCUMENTS

2008/0046997 A1* 2/2008 Wang ....................... G06F 21/79
726/16
2011/0035574 A1 2/2011 Jevans et al.
2013/0042295 A1* 2/2013 Kelly ....................... G06F 21/53
726/1
(Continued)

FOREIGN PATENT DOCUMENTS

CN 101685484 A 3/2010
CN 102624699 A 8/2012
(Continued)

OTHER PUBLICATIONS

International Search Report—PCT/CN2015/085886 dated Nov. 3, 2015.

*Primary Examiner* — Gary J Portka
(74) *Attorney, Agent, or Firm* — Troutman Sanders LLP (57) ABSTRACT

A dual-system-based data storage method, comprising the steps of (S301) judging whether the data is important data when storing data in a first system; and (S302) storing the data into a second system if it is judged that the data is important data. Thus, in a dual-system environment, the important data handled by a user in a first system can be quickly and conveniently stored into a second system, thereby sufficiently protecting information security for the user.

15 Claims, 5 Drawing Sheets (56) References Cited

U.S. PATENT DOCUMENTS

| | | | | |
|---|---|---|---|---|
| 2013/0179495 A1* | 7/2013 | Eom | ................... | G06F 9/5072 |
| | | | | 709/203 |
| 2013/0283392 A1 | 10/2013 | Mirashrafi et al. | | |
| 2014/0338004 A1* | 11/2014 | Camiel | ................... | G06F 21/62 |
| | | | | 726/30 |
| 2017/0169213 A1* | 6/2017 | Zhao | ................... | G06F 12/1408 |
| 2017/0177507 A1* | 6/2017 | Ren | ................... | G06F 12/1425 |

FOREIGN PATENT DOCUMENTS

| | | | |
|---|---|---|---|
| CN | 103246850 A | 8/2013 | |
| CN | 103391374 A | 11/2013 | |
| CN | 103413089 A | 11/2013 | |
| CN | 103413102 A | 11/2013 | |
| CN | 103458125 A | 12/2013 | |
| CN | 103914646 A | 7/2014 | |
| CN | 103975332 A | 8/2014 | |
| CN | 104091135 A | 10/2014 | |
| CN | 104331667 A | 2/2015 | |
| WO | 2011051757 A1 | 5/2011 | |

\* cited by examiner

DUAL-SYSTEM-BASED DATA STORAGE METHOD AND TERMINAL

CROSS REFERENCE TO RELATED APPLICATIONS

This application is a continuation based upon PCT/CN2015/085886 filed on Jul. 31, 2015 and claims the benefit of priority of the prior Chinese Patent Application No. 201410578085.1, filed on Oct. 24, 2014, the entire contents of which are incorporated herein by reference.

TECHNICAL FIELD

The present invention relates to the technical field of communication, and in particular relates to a dual-system-based data storage method and terminal.

BACKGROUND

A dual-system mode of a communication terminal refers to that two independent operating systems, including a first system and a second system, can be mounted in a communication terminal such as a cell phone, wherein a user processes important data in the second system, and processes ordinary data in the first system. The second system is different from a private application program, because a private application program is just a safe application program, and the second system adopts system-level partition and isolation with even better safety. The first system and the second system run concurrently, and the user can choose to enter one of these operating systems, so that data is directly stored into the chosen system where the user handles the data. For example, when the user handles certain data in the second system, the data is automatically stored into the second system and cannot be accessed or processed in the first system. But the user might also handle important data in the first system, and if this important data is automatically stored into the open first system alike, then privacy content of the user easily gets leaked.

To sum up, the prior art in practical use apparently has inconveniency and defects, and it is therefore necessary to improve the prior art.

SUMMARY OF THE INVENTION

In consideration of the above-mentioned defects, an objective of the present invention is to provide a dual-system-based data storage method and terminal, so that in a dual-system environment the important data handled by a user in a first system can be quickly and conveniently stored into a second system, thereby sufficiently protecting information security for the user.

In order to realize the above-mentioned objective, the present invention provides a dual-system-based data storage method that comprises the steps of judging whether the data is important data when storing data in a first system; and storing the data into a second system if it is judged that the data is important data.

In the data storage method of the present invention, before judging whether the data is important data when storing data in the first system, the method further comprises judging the current system environment when storing the data; directly storing the data into the second system if it is judged that the current system environment is the second system, or performing the step of judging whether the data is important data if it is judged that the current system environment is the first system.

In the data storage method of the present invention, switch entries are provided for the first system and the second system, the second system can be entered from the first system after receiving a correct password, and the first system can be entered from the second system without password.

In the data storage method of the present invention, the data stored in the second system can be imported into the first system in an encrypted backup form.

In the data storage method of the present invention, the second system is a non-open operating system.

In the data storage method of the present invention, the step of judging whether the data is important data comprises analyzing the data to determine whether a prescribed keyword is included in the data; and judging the data to be important data if it is determined that the prescribed keyword is included in the data.

In the data storage method of the present invention, the step of judging whether the data is important data comprises analyzing the data to determine whether the data belongs to a prescribed data type; and judging the data to be important data if it is determined that the data belongs to the prescribed data type.

In the data storage method of the present invention, the step of storing the data into a second system if it is judged that the data is important data comprises generating a storing prompt that suggests a user to store the data into the second system if it is judged that the data is important data; displaying an authentication interface of the second system after receiving a confirmation instruction of storing the data into the second system; and storing the data into the second system after correct authentication information is received by the authentication interface.

In the data storage method of the present invention, after generating the storing prompt, the method further comprises sending a command to store the data into the first system according to a received cancel instruction for cancelling storing the data into the second system.

In the data storage method of the present invention, the method further comprises sending a command to store the data into the first system after incorrect authentication information is received by the authentication interface.

The present invention also provides a terminal for dual-system-based data storage that comprises a communication bus, a transceiver, a memory and a processor, wherein, the communication bus communicably interconnects the transceiver, the memory and the processor, the processor stores program codes, and execution of the program codes by the processor causes the processor to judge whether the data is important data when storing data in a first system; and store the data into a second system if it is judged that the data is important data.

In the terminal for data storage of the present invention, before judging whether the data is important data when storing data in the first system, the processor is further caused to judge the current system environment when storing the data; judge whether the data is important data according to a preset rule if it is judged that the current system environment is the first system; directly store the data into the second system if it is judged that the current system environment is the second system.

In the terminal for data storage of the present invention, said judging whether the data is important data comprises analyzing the data to determine whether a prescribed keyword is included in the data; and judging the data to be important data if it is determined that the prescribed keyword is included in the data.

In the terminal for data storage of the present invention, said judging whether the data is important data comprises analyzing the data to determine whether the data belongs to a prescribed data type; and judging the data to be important data if it is determined that the data belongs to the prescribed data type.

In the terminal for data storage of the present invention, said storing the data into a second system if it is judged that the data is important data comprises generating a storing prompt that suggests a user to store the data into the second system if it is judged that the data is important data; displaying an authentication interface of the second system after receiving a confirmation instruction of storing the data into the second system; and storing the data into the second system after correct authentication information is received by the authentication interface.

In the terminal for data storage of the present invention, after generating the storing prompt, the processor is further caused to send a command to store the data into the first system according to a received cancel instruction for cancelling storing the data into the second system.

In the terminal for data storage of the present invention, the processor is further caused to send a command to store the data into the first system after incorrect authentication information is received by the authentication interface.

By means of the communication terminal of the present invention, when a user handles and stores data in the first system, if it is judged that the data is important data, said data is stored into the second system; and if the user handles and stores data in the second system, said data is stored directly into the second system. As a result, in a dual-system environment, the present invention can store the important data handled by the user in the first system into a second system quickly and conveniently, thereby sufficiently protecting information security for the user.

DETAILED DESCRIPTION OF EMBODIMENTS

In order for the objectives, features and advantages of the present invention to be more clearly understood, hereinafter, detailed description of the present invention is further provided in combination with the accompanying drawings and specific embodiments. It should be understood that, the specific embodiments described herein is merely for explaining the present invention, and is not intended to limit the present invention.

Figure 1:
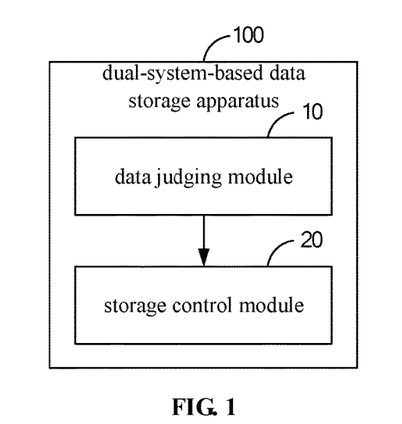
FIG. 1 is a structural schematic diagram of a dual-system-based data storage apparatus of the present invention.

FIG. 1 is a structural schematic diagram of a dual-system-based data storage system of the present invention. The data storage system 100 can be applied on a communication terminal such as a cell phone, a PDA (Personal Digital Assistant) or a tablet computer. This communication terminal is simultaneously installed with a first system and a second system that are independent from each other. The first system is preferably an open operating system, such as Android operating system or IOS (Apple's operating system), and a user can handle ordinary data in the first system. The second system is preferably a non-open operating system, such as an operating system independently developed by the terminal manufacturer, and the user can handle important data such as privacy data in the second system. Switch entries are provided respectively for the first system and the second system, the user can enter the second system from the first system after inputting a correct password, and the user can enter the first system from the second system without being required to input password. And, the data storage system 100 comprises a data judging module 10 and a storage control module 20, wherein:

The data judging module 10 is for judging whether the data is important data when storing data in the first system.

Preferably, the data judging module 10 analyzes the data to determine whether a prescribed keyword is included in the data, in particular, the data is scanned to determine whether it involves a bank account, a password, a credential picture, a certificate photo, etc., and if the data includes any prescribed keyword, the data judging module 10 judges the data to be important data. Alternatively, the data judging module 10 analyzes the data to determine whether the data belongs to a prescribed data type, in particular, the prescribed data type may be a picture type, a video type, a text document type, etc., and if the data belongs to the prescribed data type, the data judging module 10 judges the data to be important data.

The storage control module 20 is for storing the data into the second system if it is judged that the data is important data. For example, when a dual-system-based communication terminal processes and stores data such as a short message, a picture, a calendar, an audio recording, etc., firstly, the system environment that the user is currently in is judged, if the user is currently in the second system, the data processed in the second system is then directly stored into the second system; if the user is currently in the open first system, the data that is prepared to be stored is then judged according to a preset rule (i.e., keyword characteristic) to determine whether it is important data, and if the data is judged to be important data, it is then stored into the second system. Once the data is stored into the second system, the user would not be able to access or handle the data in the system environment of the first system, and therefore the security of important data is ensured. Preferably, the data stored in the second system can be imported into the first system in an encrypted backup form, and the user needs to know a correct password in order to retrieve the data.

The present invention mainly solves the problem of secured data storage in an open first system, in a dual-system-based environment, the system environment that a user is currently in is judged, so that the user can quickly saves important data such as privacy data in to a second system, thereby effectively protecting the privacy content for the user.

Figure 2:
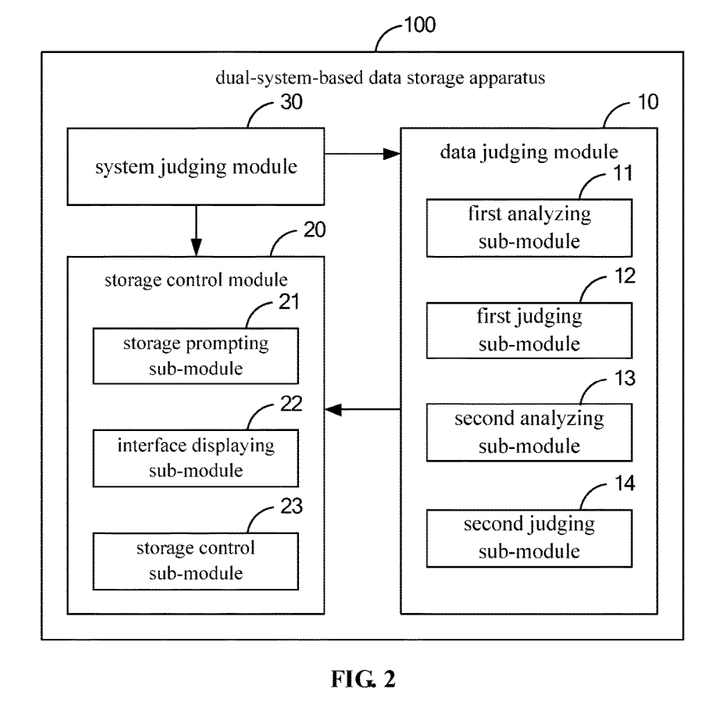
FIG. 2 is a structural schematic diagram of a dual-system-based data storage apparatus of a preferable embodiment of the present invention.

FIG. 2 is a structural schematic diagram of a dual-system-based data storage apparatus of a preferable embodiment of the present invention. The data storage system 100 can be applied on a communication terminal such as a cell phone, a PDA or a tablet computer. This communication terminal is simultaneously installed with a first system and a second system that are independent from each other. The first system is preferably an open operating system, such as Android or IOS, and a user can handle ordinary data in the first system. The second system is preferably a non-open operating system, such as an operating system independently developed by the terminal manufacturer, and the user can handle important data such as privacy data in the second system. And, the data storage system 100 comprises a data judging module 10, a storage control module 20 and a system judging module 30, wherein:

The system judging module 30 is for judging the current system environment when storing the data, said system environment can be a first system or a second system. If the current system environment is the second system, the data is then directly stored into the second system.

If the current system environment is the first system, the data judging module 10 judges whether the data is important data. The data judging module 10 further comprises:

a first analyzing sub-module 11 for analyzing the data to determine whether a prescribed keyword is included in the data. In particular, the data is scanned to determine whether it involves a bank account, a password, a credential picture, a certificate photo, etc.

a first judging sub-module 12 for judging the data to be important data if it is determined that the prescribed keyword is included in the data.

a second analyzing sub-module 13 for analyzing the data to determine whether the data belongs to a prescribed data type. In particular, the prescribed data type may be a picture type, a video type, a text document type, etc.

a second judging sub-module 14 for judging the data to be important data if it is determined that the data belongs to the prescribed data type.

If the current system environment is the second system, the storage control module 20 directly stores the data into the second system; if the current system environment is the first system and the data is important data, the storage control module 20 also stores the data into the second system. The storage control module 20 comprises:

a storage prompting sub-module 21 for generating a storing prompt that suggests a user to store the data into the second system if it is judged that the data is important data. The storing prompt can be implemented by using a text, a picture, an audio or a video to prompt the user that the data is important data and is suggested to be stored into the second system. Preferably, the storing prompt can be provided with a confirmation button and a cancel button, and after the user receives the storing prompt, the user may click on the confirmation button to send a confirmation instruction, and may also click on the cancel button to send a cancel instruction. If the cancel instruction is sent, the data is then directly stored into the first system.

an interface displaying sub-module 22 for displaying an authentication interface of the second system after receiving the confirmation instruction of storing the data into the second system. A password input box may be displayed on the authentication interface, so as to require the user to input a correct authentication password.

a storage control sub-module 23 for storing the data into the second system after correct authentication information is received by the authentication interface. Preferably, if the user has input a correct authentication password on the authentication interface, the authentication is successfully completed and then the data is stored into the second system.

Of course, the user may also input a correct authentication gesture on the authentication interface to complete the authentication operation.

By means of the present invention, when two systems are running concurrently on a communication terminal, the user's important data can be quickly stored into the second system. If the user is currently in the second system, the data handled by the user is directly stored into the second system; if the user is currently in the open first system, the data is judged to determine whether it involves important data, and if it is the case, the user is prompted to store the data into the second system, so that secured storage of important data is quickly realized, thereby protecting personal important data information.

Figure 3:
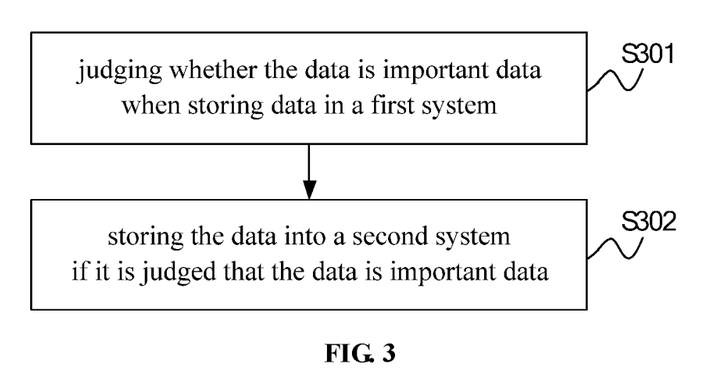
FIG. 3 is a flow chart of a dual-system-based data storage method of the present invention.

FIG. 3 is a flow chart of a dual-system-based data storage method of the present invention, which can be carried out by the data storage system 100 shown in FIG. 1 or FIG. 2, comprising the steps of:

Step S301, judging whether the data is important data when storing data in a first system.

Preferably, the data is analyzed to determine whether a prescribed keyword is included in the data, for example, the data is scanned to determine whether it involves a bank account, a password, a credential picture, a certificate photo, etc., and if the data includes any prescribed keyword, it is judged that the data is important data. Alternatively, the data is analyzed to determine whether the data belongs to a prescribed data type, in particular, the prescribed data type may be a picture type, a video type, a text document type, etc., and if the data belongs to the prescribed data type, it is judged that the data is important data.

Step S302, storing the data into a second system if it is judged that the data is important data.

For example, when a dual-system-based communication terminal processes and stores data such as a short message, a picture, a calendar, an audio recording, etc., firstly, the system environment that the user is currently in is judged, if the user is currently in the second system, the data processed in the second system is then directly stored into the second system; if the user is currently in the open first system, the data that is prepared to be stored is then judged according to a preset rule (i.e., keyword characteristic) to determine whether it is important data, and if the data is judged to be important data, it is then stored into the second system. Once the data is stored into the second system, the user would not be able to access or handle the data in the system environment of the first system, and therefore the security of important data is ensured. Preferably, the data stored in the second system can be imported into the first system in an encrypted backup form, and the user needs to know a correct password in order to retrieve the data.

Figure 4:
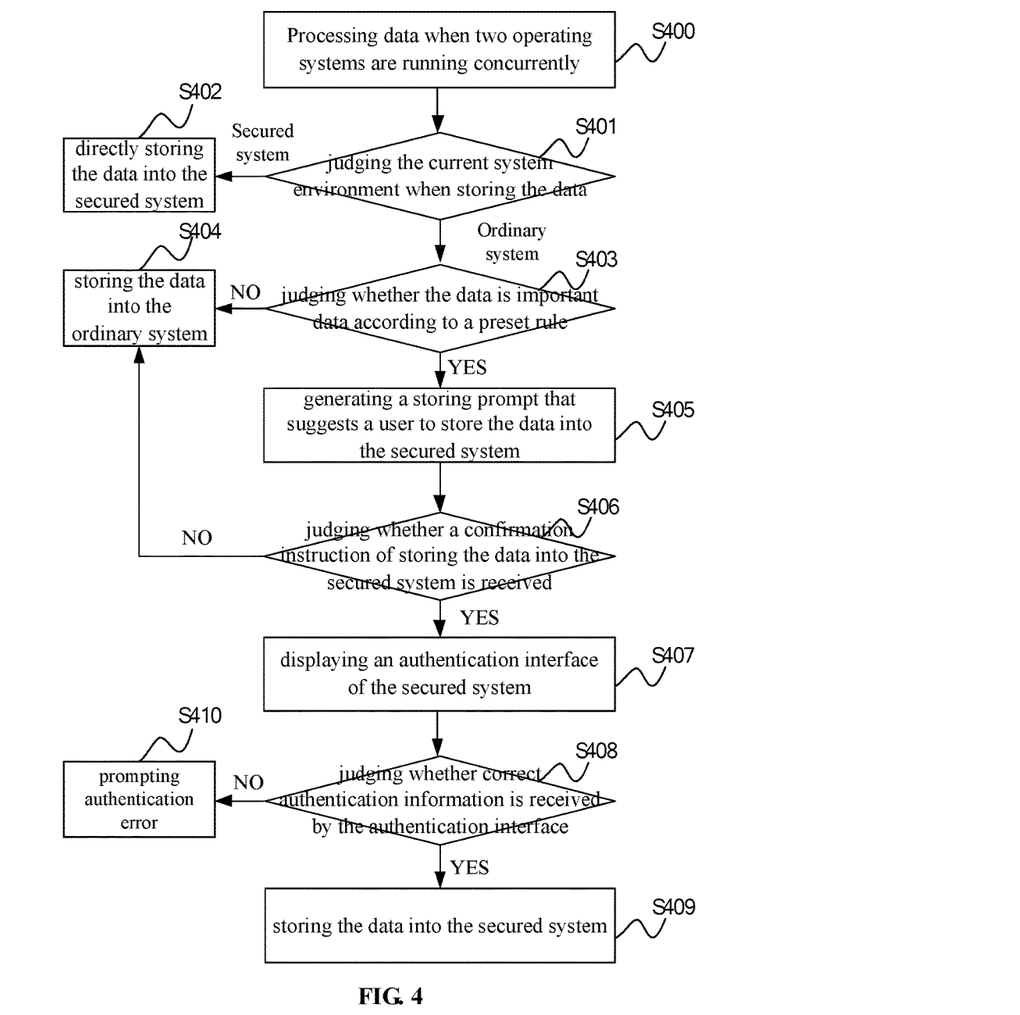
FIG. 4 is a flow chart of a dual-system-based data storage method of a preferable embodiment of the present invention.

FIG. 4 is a flow chart of a dual-system-based data storage method of a preferable embodiment of the present invention, which can be carried out by the data storage system 100 shown in FIG. 2, comprising the steps of:

Step S400, processing data when two operating systems are running concurrently.

Step S401, judging the current system environment when storing the data. Said system environment may be a first system or a second system.

Step S402, if the system environment is the second system, directly storing the data into the second system.

Step S403, if the current system environment is the first system, judging whether the data is important data. If the data is judged to be important data, Step S405 is executed; otherwise, Step S404 is executed.

Preferably, the data is analyzed to determine whether a prescribed keyword is included in the data, for example, the data is scanned to determine whether it involves a bank account, a password, a credential picture, a certificate photo, etc., and if the data includes any prescribed keyword, it is judged that the data is important data. Alternatively, the data is analyzed to determine whether the data belongs to a prescribed data type, in particular, the prescribed data type may be a picture type, a video type, a text document type, etc., and if the data belongs to the prescribed data type, it is judged that the data is important data.

Step S404, if it is judged that the data is not important data, storing the data into the first system.

Step S405, if it is judged that the data is important data, generating a storing prompt that suggests the user to store the data into the second system.

The storing prompt can be implemented by using a text, a picture, an audio or a video to prompt the user that the data is important data and is suggested to be stored into the second system.

Step S406, judging whether a confirmation instruction of storing the data into the second system is received. If it is the case, Step S407 is executed; otherwise, Step S404 is executed.

Preferably, the storing prompt can be provided with a confirmation button and a cancel button, and after the user receives the storing prompt, the user may click on the confirmation button to send a confirmation instruction, and may also click on the cancel button to send a cancel instruction. If the cancel instruction is sent, the data is then directly stored into the first system.

Step S407, displaying an authentication interface of the second system after receiving a confirmation instruction of storing the data into the second system.

A password input box may be displayed on the authentication interface, so as to require the user to input a correct authentication password.

Step S408, judging whether correct authentication information is received by the authentication interface. If it is the case, Step S409 is executed; otherwise, Step S410 is executed.

Step S409, storing the data into the second system after correct authentication information is received by the authentication interface.

Preferably, if the user has input a correct authentication password on the authentication interface, the authentication is successfully completed and then the data is stored into the second system. Of course, the user may also input a correct authentication gesture on the authentication interface to complete the authentication operation.

Step S410, if no correct authentication information is received by the authentication interface, prompting authentication error. Then the data is stored into the first system by default.

Figure 5A:
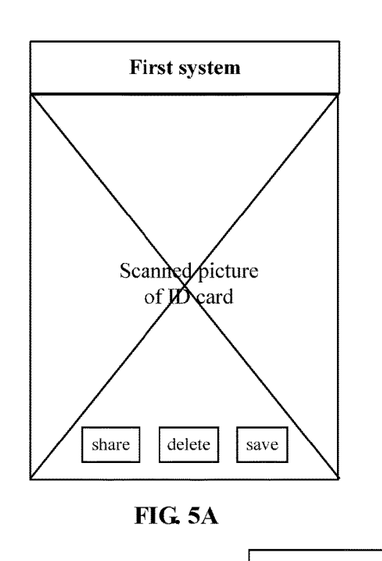
FIGS. 5A-5C are operation interface views of the dual-system-based data storage method of a preferable embodiment of the present invention.
Figure 5B:
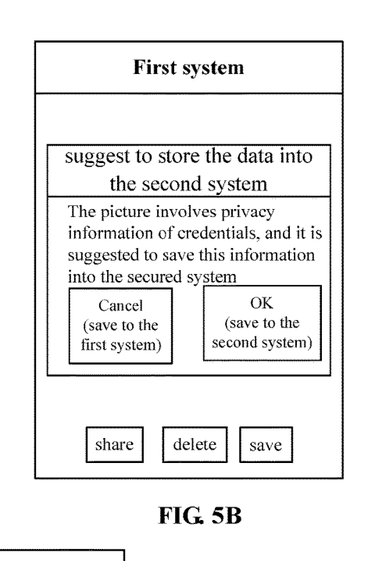
Figure 5C:
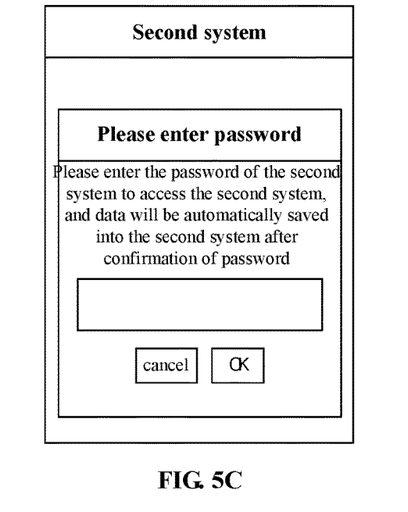

FIGS. 5A-5C are operation interface views of the dual-system-based data storage method of a preferable embodiment of the present invention. When a user stores data such as a text document, an audio recording, a picture, a short message or a calendar in a communication terminal, the system environment that the user is currently in is judged, if the current system environment is the second system, the data such as the text document, the audio recording, the picture, the short message or the calendar is then directly stored into the second system, and the user can only access and handle this data in the second system; if the current system environment is the first system, the data is then judged to determine whether it involves a prescribed keyword such as a bank account, a password, a credential picture or a certificate photo, and if it is the case, the data is then judged to be important data. As shown in FIG. 5A, when a scanned ID (Identification) card picture is generated after a user scans an ID card, the system recognizes that this scanned ID card prescribed keyword includes the prescribed keyword of an ID card number corresponding to the ID card, and prompts the user that this data involves privacy information if credentials and that it is suggested to save this data into the second system, as shown in FIG. 5B, if the user clicks on the OK button, it means the user agrees to save the data into the second system; if the user clicks on the Cancel button, the data is then stored into the first system. If the user clicks on the OK button, a password authentication interface for the second system is then popped, as shown in FIG. 5C, which prompts the user to input an authentication password for the second system in the password input box, and if the user has input a correct authentication password, the data is then automatically stored into the second system.

Figure 6:
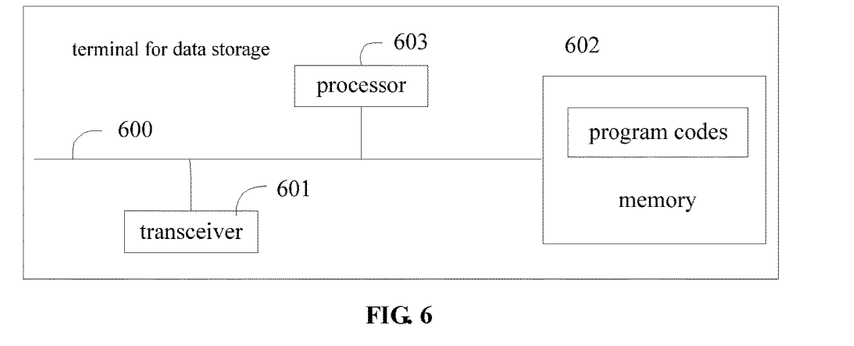
FIG. 6 is a structural schematic diagram of a terminal for dual-system-based data storage of the present invention.

FIG. 6 is a structural schematic diagram of a terminal for dual-system-based data storage of the present invention. As shown in FIG. 6, the terminal for dual-system-based data storage comprises a communication bus 600, a transceiver 601, a memory 602 and a processor 603 (the data storage terminal may have one or more processors 603, and FIG. 6 shows one processor for example), wherein:

The communication bus 600 communicably interconnects the transceiver 601, the memory 602 and the processor 603.

The processor 603 stores program codes, and execution of the program codes by the processor 603 causes the processor 603 to perform the following operation steps:

the processor 603 judges whether the data is important data when storing data in a first system;

the processor 603 stores the data into a second system if it is judged that the data is important data.

Preferably, before the processor 603 judges whether the data is important data when storing data in the first system, the processor 603 is also caused to perform the following operation steps:

judging the current system environment when storing the data;

judge whether the data is important data according to a preset rule if it is judged that the current system environment is the first system;

directly store the data into the second system if it is judged that the current system environment is the second system.

Preferably, the processor 603 judging whether the data is important data comprises:

analyzing the data to determine whether a prescribed keyword is included in the data; and judging the data to be important data if it is determined that the prescribed keyword is included in the data.

Preferably, the processor 603 storing the data into a second system if it is judged that the data is important data comprises:

generating a storing prompt by means of the transceiver 601 that suggests the user to store the data into the second system if it is judged that the data is important data;

displaying an authentication interface of the second system after the transceiver 601 receives a confirmation instruction of storing the data into the second system; and storing the data into the second system after correct authentication information is received by the authentication interface.

To sum up, by means of a communication terminal of the present invention, with two systems running concurrently, when a user handles and stores data in the first system, if it is judged that the data is important data, said data is stored into the second system; and if the user handles and stores data in the second system, said data is stored directly into the second system. As a result, in a dual-system environment, the present invention can store the important data handled by the user in the first system into a second system quickly and conveniently, thereby sufficiently protecting information security for the user.

Apparently, the present invention may also have various other embodiments, and under the condition of not deviating from the concept and essence of the present invention, those familiar with the art can make various changes and modifications on the basis of the present invention, and these corresponding changes and modifications should be embraced in the protection scope defined by the appended claims of the present invention.

The invention claimed is:

1. A dual-system-based data storage method, wherein, comprising the steps of
   judging whether the data is important data when storing data in a first system; and
   storing the data into a second system if it is judged that the data is important data,
   wherein the step of storing the data into a second system if it is judged that the data is important data comprises:
   generating a storing prompt that suggests a user to store the data into the second system if it is judged that the data is important data,
   displaying an authentication interface of the second system after receiving a confirmation instruction of storing the data into the second system; and
   storing the data into the second system after correct authentication information is received by the authentication interface.

2. The dual-system-based data storage method of claim 1, wherein, switch entries are provided for the first system and the second system, the second system can be entered from the first system after receiving a correct password, and the first system can be entered from the second system without password.

3. The dual-system-based data storage method of claim 1, wherein, the data stored in the second system can be imported into the first system in an encrypted backup form.

4. The dual-system-based data storage method of claim 1, wherein, the second system is a non-open operating system.

5. The dual-system-based data storage method of claim 1, wherein, before judging whether the data is important data when storing data in the first system, the method further comprises
   judging the current system environment when storing the data;
   directly storing the data into the second system if it is judged that the current system environment is the second system, or
   performing the step of judging whether the data is important data if it is judged that the current system environment is the first system.

6. The dual-system-based data storage method of claim 1, wherein, the step of judging whether the data is important data comprises
   analyzing the data to determine whether a prescribed keyword is included in the data; and
   judging the data to be important data if it is determined that the prescribed keyword is included in the data.

7. The dual-system-based data storage method of claim 1, wherein, the step of judging whether the data is important data comprises
   analyzing the data to determine whether the data belongs to a prescribed data type; and
   judging the data to be important data if it is determined that the data belongs to the prescribed data type.

8. The dual-system-based data storage method of claim 1, wherein, after generating the storing prompt, sending a command to store the data into the first system according to a received cancel instruction for cancelling storing the data into the second system.

9. The dual-system-based data storage method of claim 1, wherein, sending a command to store the data into the first system after incorrect authentication information is received by the authentication interface.

10. A terminal for dual-system-based data storage, wherein, comprising a communication bus, a transceiver, a memory and a processor, wherein, the communication bus communicably interconnects the transceiver, the memory and the processor, the processor stores program codes, and execution of the program codes by the processor causes the processor to
    judge whether the data is important data when storing data in a first system; and
    store the data into a second system if it is judged that the data is important data,
    wherein said storing the data into a second system if it is judged that the data is important data comprises:
    generating a storing prompt that suggests a user to store the data into the second system if it is judged that the data is important data;
    displaying an authentication interface of the second system after receiving a confirmation instruction of storing the data into the second system; and
    storing the data into the second system after correct authentication information is received by the authentication interface.

11. The terminal of claim 10, wherein, before judging whether the data is important data when storing data in the first system, the processor is further caused to
    judge the current system environment when storing the data;
    judge whether the data is important data according to a preset rule if it is judged that the current system environment is the first system;
    directly store the data into the second system if it is judged that the current system environment is the second system.

12. The terminal of claim 10, wherein, said judging whether the data is important data comprises
    analyzing the data to determine whether a prescribed keyword is included in the data; and
    judging the data to be important data if it is determined that the prescribed keyword is included in the data.

13. The terminal of claim 10, wherein, said judging whether the data is important data comprises
    analyzing the data to determine whether the data belongs to a prescribed data type; and
    judging the data to be important data if it is determined that the data belongs to the prescribed data type.

14. The terminal of claim 10, wherein, after generating the storing prompt, the processor is further caused to send a command to store the data into the first system according to a received cancel instruction for cancelling storing the data into the second system.

15. The terminal of claim 10, wherein, the processor is further caused to send a command to store the data into the first system after incorrect authentication information is received by the authentication interface.

* * * * *